United States Patent
Obata et al.

(10) Patent No.: US 6,766,244 B2
(45) Date of Patent: Jul. 20, 2004

(54) UPLOADING AND MANAGING VEHICLE POSITION INFORMATION

(75) Inventors: Hirotaka Obata, Hiratsuka (JP); Naohiko Gonmori, Yokohama (JP); Takahiro Tajima, Tokyo (JP); Hiroyuki Nakagawa, Narashino (JP); Makoto Ijichi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 10/087,387

(22) Filed: Mar. 1, 2002

(65) Prior Publication Data
US 2002/0123840 A1 Sep. 5, 2002

(30) Foreign Application Priority Data
Mar. 1, 2001 (JP) .......................................... 2001-056548

(51) Int. Cl.[7] .............................................. G01C 21/26
(52) U.S. Cl. ........................................ 701/207; 340/988
(58) Field of Search ..................................... 701/207, 202, 701/204, 213; 340/988, 989, 982, 994, 990

(56) References Cited

U.S. PATENT DOCUMENTS 6,317,060 B1 * 11/2001 Jones .......................... 340/994
6,492,912 B1 * 12/2002 Jones .......................... 340/994
6,618,668 B1 *  9/2003 Laird .......................... 701/204

FOREIGN PATENT DOCUMENTS

| JP | 2000-285389 | 10/2000 |
| JP | 2001-014592 A | 1/2001 |

* cited by examiner

Primary Examiner—Marthe Y. Marc-Coleman
(74) Attorney, Agent, or Firm—Townsend and Townsend and Crew LLP

(57) ABSTRACT

A technology is provided for timely reporting on vehicle positions to a control center without unnecessary spending on communication costs. The positions of a plurality of moving bodies which are being managed are detected. Determinations are made on whether or not the positions of these moving bodies are within specified multi-stage distance ranges. As a result of this determination, when the position of the moving body enters into a distance range for one of the stages, the position of this moving body is wirelessly reported to a control center.

21 Claims, 8 Drawing Sheets

UPLOADING AND MANAGING VEHICLE POSITION INFORMATION

CROSS-REFERENCES TO RELATED APPLICATIONS

This application is related to and claims priority from Japanese Patent Application No. 2001-056548, filed Mar. 1, 2001, the disclosure of which is incorporated herein by reference.

BACKGROUND OF THE INVENTION

The present invention relates to monitoring positions of moving objects and, more particularly, to methods and systems for reporting the positions of one or more moving bodies for managing the position data of the moving bodies.

In the field of transport, e.g., delivery vehicles, shipping trucks, taxis, and rail buses, there is a need to operate and manage a large number of vehicles efficiently and accurately. To determine the operation status of various types of moving bodies such as automobiles, various technologies for combining a measuring technology that uses a GPS (Global Positioning System) and a wireless communication technology to automatically collect and monitor the positions of the moving bodies at a control center have been developed. For example, in Japanese laid-open patent publication number 2000-285389, a technology is disclosed wherein when a vehicle equipped with a mobile terminal reaches a checkpoint, the current position of the vehicle is reported to the control center.

However, simply reporting the vehicle position only when a checkpoint is reached is inadequate for efficiently managing vehicles. For example, if a shipping truck is headed toward a loading site that is a checkpoint, the current position would be reported to the control center when the loading site is reached. Inventory operations and preparations for loading would begin after arrival, which may result in an unnecessarily long waiting period at the loading site for the shipping truck. The accumulation of these unnecessary waiting times results in a significant loss of efficiency per delivery truck per day. This loss of efficiency is extremely large when the overall operation of a large number of delivery trucks over a year is considered.

In order to overcome this problem, the vehicle position can be reported at fixed intervals, thus allowing the control center to inform the loading site ahead of time regarding the arrival of the shipping trucks. However, reporting vehicle positions at fixed intervals results in an extremely large number of reports. When a large number of shipping trucks are being operated, the communication costs become very high and render such an approach impractical.

BRIEF SUMMARY OF THE INVENTION

Embodiments of the present invention are directed to a technology for reporting vehicle positions at appropriate times to a control center without unnecessarily increasing communication costs.

An aspect of the present invention is directed to a mobile system to be installed in a vehicle monitored by a vehicle position management system having a detection device configured to detect a position of the vehicle. The mobile system comprises a storage module configured to store a plurality of checkpoints associated with a planned route of the vehicle. An evaluation module is configured to evaluate whether or not a vehicle position obtained from the detection device of the vehicle position management system is within a predetermined distance range organized as a plurality of stages from the checkpoint. An output module is configured to generate and output a signal based on evaluation by the evaluation module to provide wireless reporting of the vehicle position to a control center of the vehicle position management system when the vehicle position enters the distance range of one of the stages.

In some embodiments, the output module is configured to generate and output a signal, if the evaluation module indicates that the vehicle position is outside the predetermined distance range, to provide wireless reporting of the vehicle position to the control center of the vehicle position management system at predetermined time intervals. The storage module is configured to receive from the control center operations settings data containing the planned route and the checkpoints and to store the operations settings data, when the output module generates and outputs the signal to provide wireless reporting of the vehicle position to the control center.

Another aspect of the invention is directed to a mobile system to be installed in a vehicle monitored by a vehicle position management system having a detection device configured to detect a position of the vehicle. The mobile system comprises a storage module configured to store a plurality of checkpoints associated with a planned route of the vehicle. An evaluation module is configured to evaluate whether or not a vehicle position obtained from the detection device of the vehicle position management system is within a predetermined distance range organized as a plurality of stages from the checkpoint. An output module is configured to generate and output a signal, if the evaluation module indicates that the vehicle position is outside the predetermined distance range, to provide wireless reporting of the vehicle position to the control center of the vehicle position management system at predetermined time intervals.

In some embodiments, the output module is configured to generate and output a signal based on evaluation by the evaluation module to provide wireless reporting of the vehicle position to a control center of the vehicle position management system when the vehicle position enters the distance range of one of the stages. The storage module is configured to receive from the control center operations settings data containing the planned route and the checkpoints and to store the operations settings data, when the output module generates and outputs the signal to provide wireless reporting of the vehicle position to the control center.

In accordance with another aspect of the invention, a vehicle position management system comprises a detection device configured to detect a position of the vehicle, a mobile system, and a vehicle position control system. The mobile system includes a mobile system storage module configured to store a plurality of checkpoints associated with a planned route of the vehicle; an evaluation module configured to evaluate whether or not a vehicle position obtained from the detection device of the vehicle position management system is within a predetermined distance range organized as a plurality of stages from the checkpoint; and a mobile system output module configured to generate and output a signal based on evaluation by the evaluation module to provide wireless reporting of the vehicle position when the vehicle position enters the distance range of one of the stages. The vehicle position control system includes a control system storage module configured to store operations settings data including the planned route of the vehicle and the plurality of checkpoints associated with the planned route; a monitoring module configured to detect when the output module generates and outputs the signal to provide wireless reporting of the vehicle position; and a control system output module configured to read and wirelessly send the planned route and the operations settings data to the mobile system when the output module generates and outputs the signal to provide wireless reporting of the vehicle position as detected by the monitoring module.

In accordance with another aspect of the present invention, a method for managing vehicles comprises detecting a position of a vehicle being managed, and evaluating whether or not the detected vehicle position of the vehicle is within a predetermined distance range organized as a plurality of stages from one of a plurality of checkpoints associated with a planned route of the vehicle. The vehicle position is wirelessly reported to a control center when the vehicle position enters the distance range of one of the stages.

In some embodiments, the method further comprises wirelessly reporting the vehicle position to a control center at predetermined time intervals, if the evaluated vehicle position is outside the predetermined distance range. The method may further comprise wirelessly receiving from the control center operations settings data containing the planned route and the checkpoints and storing the operations settings data, when the output module generates and outputs the signal to provide wireless reporting of the vehicle position to the control center.

In accordance with another aspect of the invention, a method for managing vehicles comprises detecting a position of a vehicle being managed; evaluating whether or not the detected vehicle position of the vehicle is within a predetermined distance range organized as a plurality of stages from one of a plurality of checkpoints associated with a planned route of the vehicle; and wirelessly reporting the vehicle position to a control center at predetermined time intervals, if the evaluated vehicle position is outside the predetermined distance range.

Another aspect of the invention is directed to a computer program product stored on a computer readable medium for managing vehicles. The computer program product comprises code for detecting a position of a vehicle being managed; code for evaluating whether or not the detected vehicle position of the vehicle is within a predetermined distance range organized as a plurality of stages from one of a plurality of checkpoints associated with a planned route of the vehicle; and code for wirelessly reporting the vehicle position to a control center when the vehicle position enters the distance range of one of the stages.

In some embodiments, the computer program product further comprising code for wirelessly reporting the vehicle position to a control center at predetermined time intervals, if the evaluated vehicle position is outside the predetermined distance range. The computer program product may further comprise code for wirelessly receiving from the control center operations settings data containing the planned route and the checkpoints and storing the operations settings data, when the output module generates and outputs the signal to provide wireless reporting of the vehicle position to the control center.

DETAILED DESCRIPTION OF THE INVENTION

Figure 1:
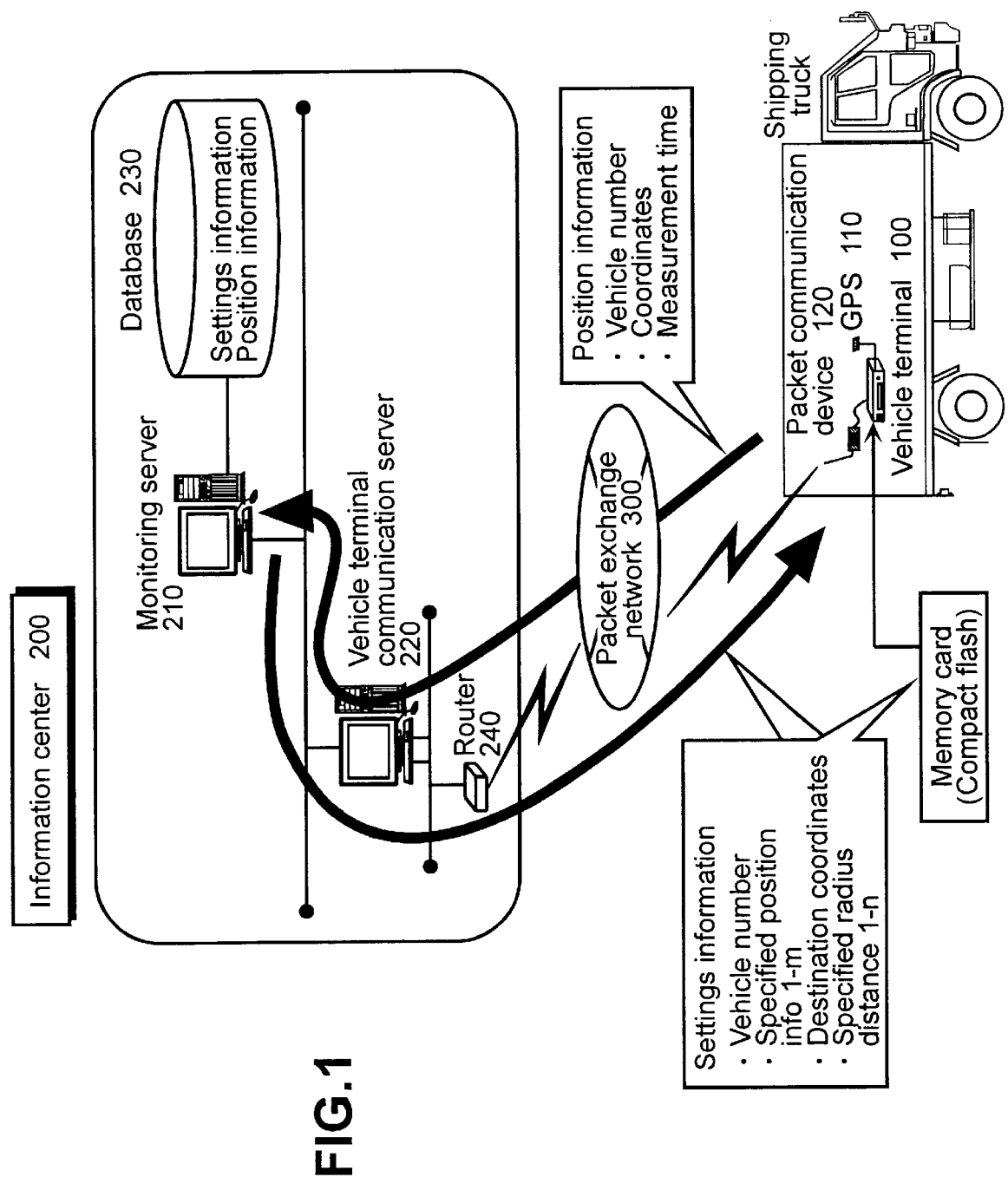
FIG. 1 is a system block diagram of a moving body position management system according to an embodiment of the present invention.

As shown in FIG. 1, the moving body position management system of the present invention comprises mainly a vehicle terminal (mobile terminal) 100 and its accessory devices mounted on each vehicle and an information center (control center) 200 that collects and monitors the positions of a number of such vehicles (for simplicity, FIG. 1 shows only one vehicle). As the accessory devices, a GPS receiver 110 with an antenna for detecting the position of the vehicle and a wireless packet communication device 120 for communicating with the control center 200 are connected to the vehicle terminal 100. The vehicle terminal 100 comprises the following: a microcomputer that synthesizes and executes various processing functions and control functions; various types of memory; interfaces for the GPS receiver 110 and the wireless packet communication device 120; and an IF for a memory card, and the like. The vehicle terminal 100 can be implemented with a portable size personal computer.

The information center 200 is basically equipped with a monitoring server 210 and a vehicle terminal communication server 220. The monitoring server 210 has a database 230 constructed from an external magnetic disk device or the like. This database 230 stores pre-set information such as position information and destination information (specified position information) and the like for the ID of each vehicle (e.g., the vehicle number). The monitoring server 210 collects and monitors the position of each vehicle through the vehicle terminal communication server 220. A router 240 is connected to the vehicle terminal communication server 220. The vehicle terminal communication server 220 communicates with the vehicle terminal 100 of each vehicle through the router 240. The router 240 of the information center 200 and the wireless packet communication device 120 of the vehicle terminal 100 conduct data communication via a packet exchange network 300.

Figure 2:
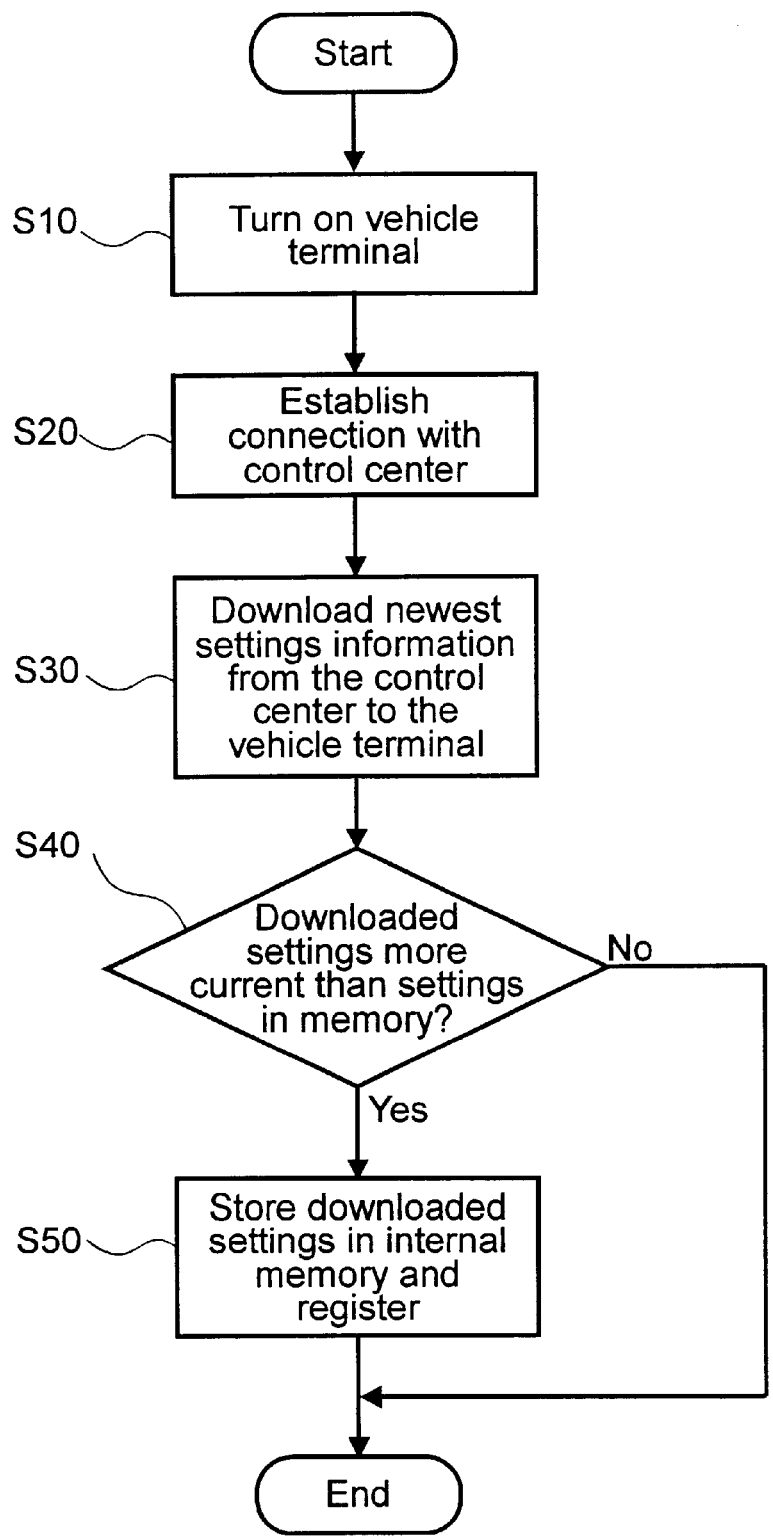
FIG. 2 is a flow chart representing the downloading operation for the basic pre-set information of the mobile terminal in the system of FIG. 1 according to an embodiment of the present invention.
Figure 4:
FIG. 4 is a model diagram of a screen for setting each defined radius in the monitoring server system of the information center in the system of FIG. 1 according to an embodiment of the present invention.

An example where the moving body vehicle is a transport truck is described. FIG. 4 depicts a model diagram of a "vehicle settings information registration screen" on the display screen of the monitoring server. At the monitoring server 210, using the vehicle number as a key, the latitude and longitude for the position for each of the delivery addresses (destination sites) of the vehicle and a defined radius (distance range) from each latitude and longitude (delivery address) are set in advance. These are registered in the database 230 as the "pre-set information." FIG. 2 depicts a flow chart representing the updating operation of the pre-set information at the vehicle terminal 100. At the vehicle terminal 100 of each vehicle, when a specified operation is conducted, such as turning on the power (S10) or pressing an operation button or the like, communication with the information center 200 is initiated (S20). The individual pre-set information registered in the database 230 of the monitoring server 210 is downloaded (S30). At this time, the downloaded pre-set information and the pre-set information already stored in the internal memory are compared to see which is more recent (S40). If the downloaded pre-set information is more recent, the pre-set information in the memory is replaced with the downloaded information (S50), or else, if both are the same, replacement is not conducted (END).

Figure 3:
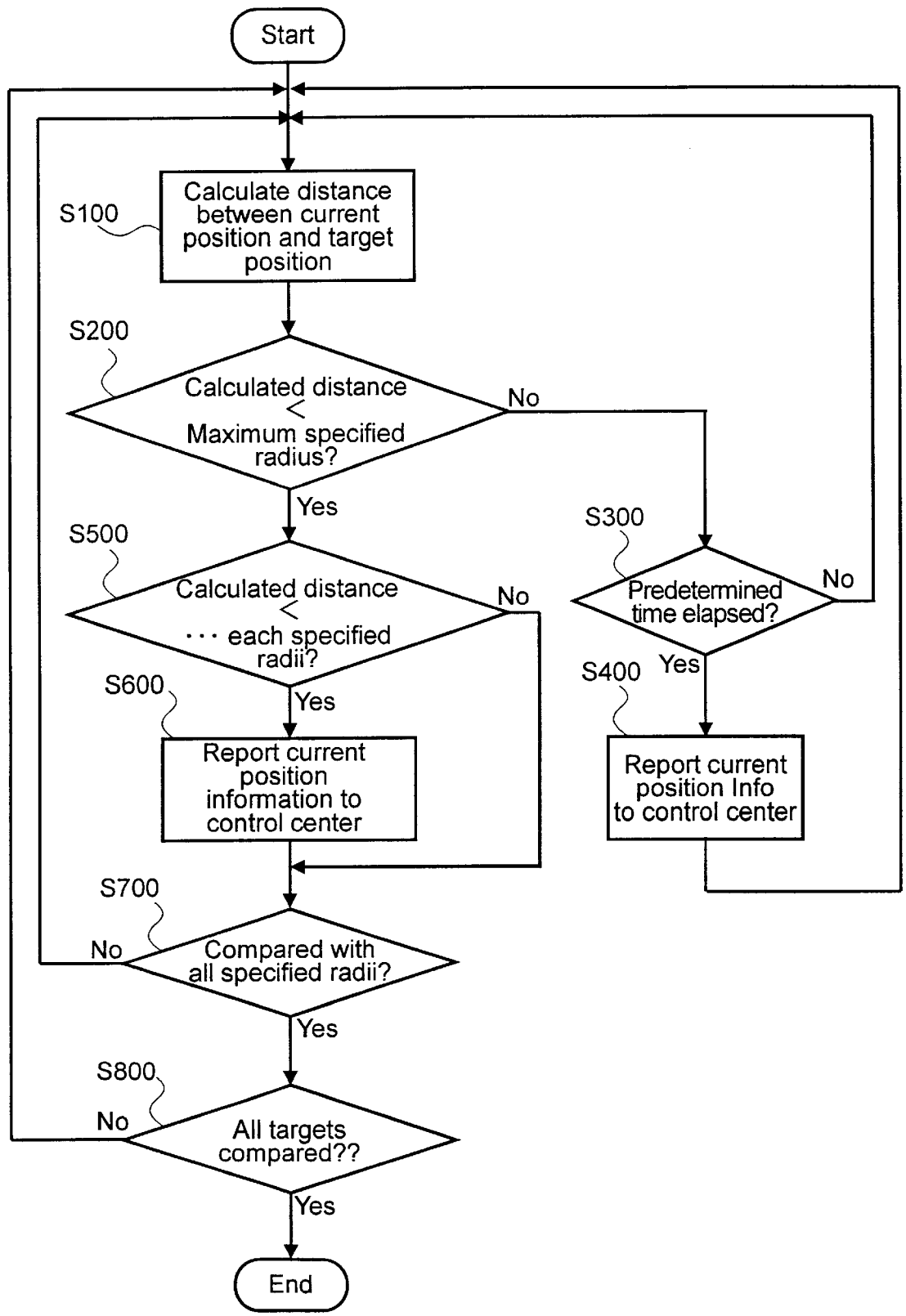
FIG. 3 is a flow chart representing the reporting operation for the position information of the mobile terminal in the system of FIG. 1 according to an embodiment of the present invention.

Next, referring to the flow chart of FIG. 3, the action of reporting the vehicle position at the vehicle terminal 100 for a vehicle in motion is described. First, the distance between the current position (latitude and longitude) of the vehicle as obtained from GPS and the delivery site (latitude and longitude) in the pre-set information stored in memory is calculated (S100). Next, it is determined whether or not the resulting calculated distance is within a maximum defined radius (for example 50 km) (S200). As a result of this determination, if the resulting calculated distance is greater than the maximum defined radius, then there is a calculation on whether or not a specified amount of time (time period) has passed since the last report on the vehicle position (S300). If the specified time has passed, the current position information is reported (S400), and there is a return to the processing of S100 described above. In addition to latitude and longitude, this position information may include supplemental information such as vehicle number, the date and time of the position measurement, and vehicle speed and the like. In addition, at this time, because the vehicle is still far from the delivery site awaiting the vehicle arrival, the information center does not need to know the minute real time positions with great frequency. Because of this, the position can be reported at a comparatively longer time period, and there does not need to be unnecessary transmission costs. On the other hand, if the specified amount of time has not passed in S300 described above, the processing returns to S100 described above. This system of reporting positions at specified time intervals when the vehicle is outside the maximum defined radius from the delivery site is called a fixed time interval position reporting mode. In S200 described above, if the resulting calculated distance is less than or equal to the maximum defined radius, there is a change to a multi-step distance interval position reporting mode. In other words, the calculated distance obtained from S100 described above is compared to see whether or not it is less than or equal to each of the defined radius distances (S500). At this time, the defined radius distances that have already been compared are removed from the comparison processing in order to avoid unnecessary redundant processing. Of the defined radius distances that have yet to be compared, the maximum defined radius distance becomes the comparison standard. If the calculated distance is smaller than the defined radius distance that has not been compared yet, the current position information and the like are reported (S600) in the same manner as S400 described above.

As an application of this, when the distance is smaller than the smallest defined radius distance, by combining with speed information, the arrival at a checkpoint (supply site and the like) can be automatically determined, and this can be registered. At this time, by having a site master (position information, site related information, work status information, site name and the like) on the vehicle device, the work status at that location (if at a delivery center, "loading", if at a supply site "unloading" and the like) can also be registered automatically. Next, once the work at the location is completed and it is confirmed that the vehicle is moving either by speed or position information, the work status of loading or unloading and the work time can be automatically reported together with the position information. This work status and work time is recorded in an external recording medium and is reported as needed. Furthermore, in situations where the driver pushes an operation button on the vehicle terminal when registering his arrival or his work status, it is possible to check for errors by comparing what is registered at that location with information on the site master. By doing so, the work record data of a daily report and the like, which in the prior art was created by the driver of the vehicle, can be collected automatically by the control center 200 without increasing the work load for the driver to register the data. These data can also be sent to the transportation companies of these transport trucks.

Next, referring to FIG. 3, it is determined whether or not the comparison processing of S500 described above has been completed for all of the defined radius distances which have been pre-set (S700). For the comparison processing of S500 for each defined radius, even if the calculated distance is larger than the specified radius distance that is yet to be compared, the determination processing of S700 is implemented. As a result of this determination processing at S700, if there is still a defined radius distance that has not been compared, there is a return to the processing of the previously described S100. If the comparison processing steps for all of the specified radius distances have been completed, it is determined whether or not all of the processing steps of the previously described S100 to S700 have been completed for all of the supply sites (delivery sites) (S800). If the processing steps for all of the supply sites have been completed, there is a change to a constant time interval position reporting mode, or the reporting operation for the vehicle position is completed (END). If it is incomplete, there is a return to the previously described S100.

The above operations is implemented by running a program read from the ROM in the mobile terminal 100. However, this program can be installed externally by a portable recording medium such as a CD-ROM and the like or by transmission from a network such as the internet (wireless or wired) and the like or through a satellite line.

As shown in the model diagram of the display screen of FIG. 4, a concrete example of the defined radii as described above can be set at the monitoring server system 210 of the information center 200. For each vehicle and for each delivery site, the specified radii 1–5 can be set to be registered at 1 km intervals to a maximum of a little less than 7000 km. For example, the defined radius 1 is set at 50 km, the defined radius 2 is at 40 km, the defined radius 3 is at 30 km, the defined radius 4 is at 20 km, and the defined radius 5 is set at 10 km. In this manner, the vehicle approaching the delivery site can be monitored at 10 km intervals.

With the above system, determinations are made on whether or not the position of the vehicle is within specified distance ranges. These distance ranges are divided into several stages or levels from the check point. When the vehicle terminal 100 enters within a distance range of any of the stages, it reports wirelessly on its position to the control center 200. Therefore, compared to the system of the prior art in which the mobile terminal position is reported to the control center at a constant time interval, unnecessary transmission costs are avoided, and the vehicle position is reported to the control center 200 in a timely manner. As a result, for example, if it is known in advance that the transport truck is approaching the loading site, preparations for loading the cargo can be made at the loading site in the time it takes for the transport truck to arrive. The transport truck should arrive in a timely manner right when this preparation is completed, and loading can then begin. An efficient loading and unloading schedule with no unnecessary stopping times becomes possible.

In addition, if the vehicle is outside of a certain distance range from the destination site, the vehicle terminal wirelessly reports its position to the control center at specified time periods. When the vehicle enters within the distance range, the vehicle position is wirelessly reported to the control center 200. By doing so, when the destination site that is awaiting the arrival of the vehicle is a far distance, there is no need to know the minute positions in real time with great frequency. The reporting of the position can be at relatively long time periods, and communication costs do not need to be spent unnecessarily. When the vehicle enters within the distance range, the position of the moving body is reported to the control center 200. Therefore, as with the previously described transport truck, an efficient scheduling becomes possible where there is no unnecessary stopping time at the destination site awaiting the arrival of the vehicle.

Figure 5:
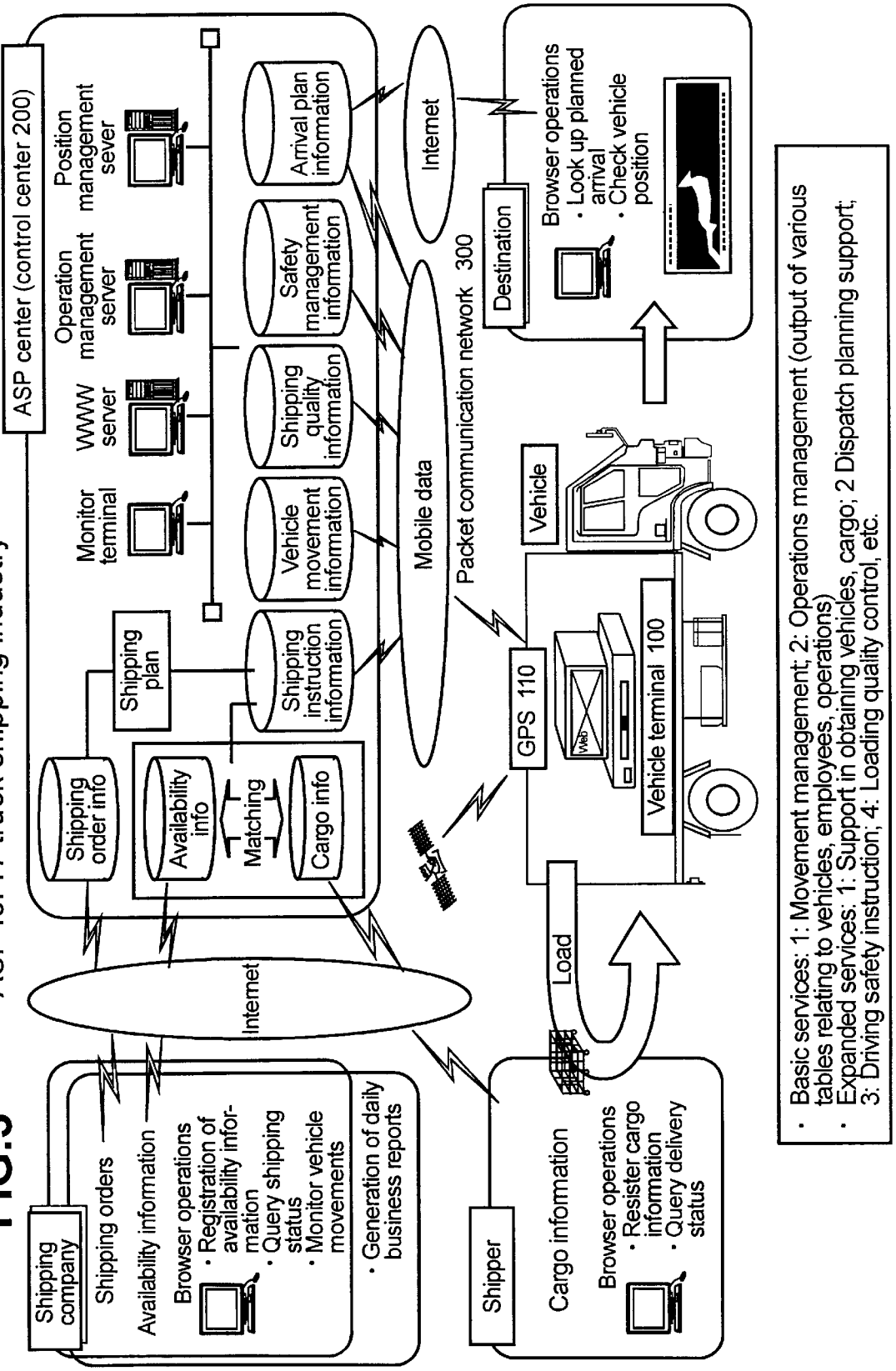
FIG. 5 is a system block diagram illustrating a moving body position management system according to an embodiment of the present invention as applied to the trucking industry.
Figure 6:
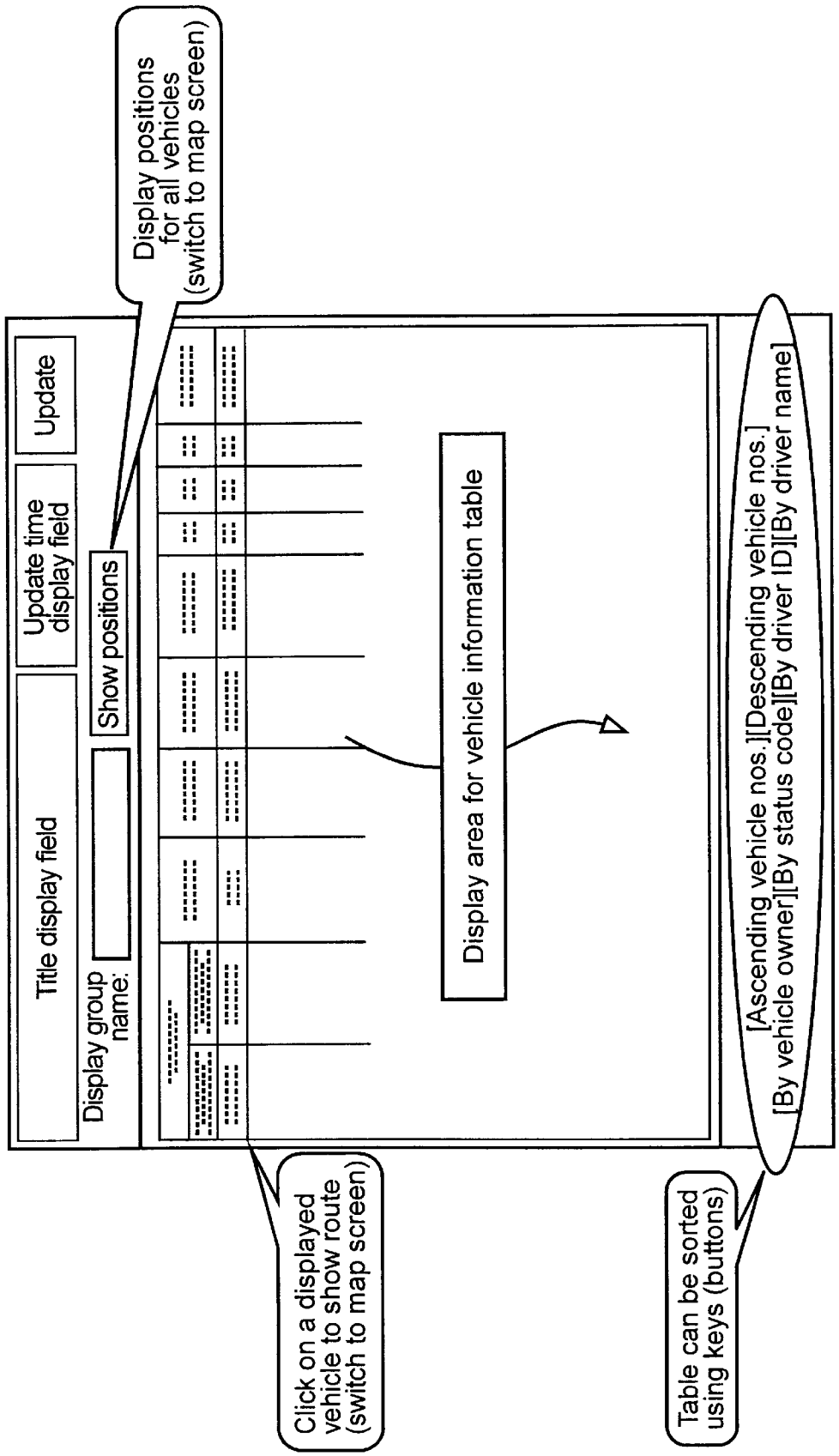
FIG. 6 is a model diagram of a vehicle information summary displayed on a display screen of a server at the control center of FIG. 5.
Figure 7:
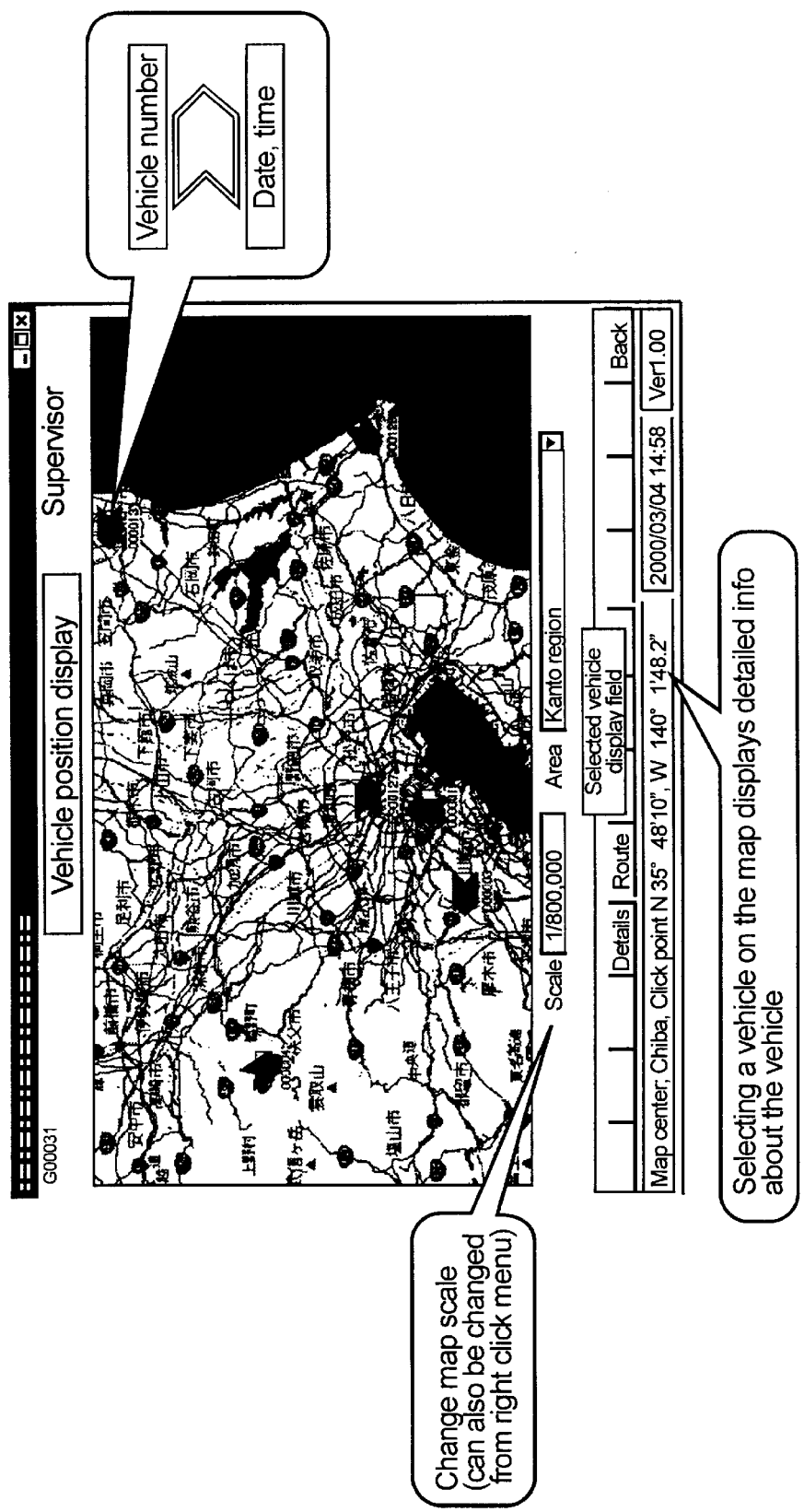
FIG. 7 is a model diagram of a vehicle position display displayed on the display screen at the server of the control center of FIG. 5.

Referring to FIGS. 5–8, an example of how the moving body position management system and method described above as applied to the transport truck industry is briefly introduced. As shown in the model diagram of FIG. 5 in which the present invention is applied to the transport truck industry according to an embodiment, a distribution ASP (Application Service Provider), which is the control center 200, conducts communication with the vehicle terminal 100 of each vehicle (for simplicity, one vehicle is shown in the figure) via the mobile data packet communication network 300. Various information, such as vehicle position and work status and the like, is collected. The ASP (Application Service Provider) center exchanges various information via the internet with the shipping company, the shipper, and the delivery site. For example, information on the position and work status of each vehicle can be provided to the shipping company, the shipper, and the delivery site in order to help improve work efficiency and to have vehicle usage that is not wasteful. As shown in FIG. 5, the ASP center 200 is equipped with various servers and databases for performing the functions of the monitoring server 210 as described previously, as well as communication devices and the like. As shown in the screen model diagram of FIG. 6, various attribute data, such as the vehicle number (display vehicle number and physical vehicle number) and name of the driver and the like, are displayed for each vehicle. The screen content of the vehicle information summary as shown in FIG. 6 is also displayed with the clients terminals 100 of the trucking company and the like which can communicate with the ASP center 200. With this display screen, using a pointing device such as a mouse and the like, a display portion for a vehicle number can be selected. A map screen is displayed, and a route of the position history of this vehicle is displayed. When a button labeled as the position display for all vehicles is selected, as shown in the model diagram of the map screen of FIG. 7, the position and direction of movement of the vehicles are displayed by arrows on the map. Using a pointing device such as a mouse and the like, the arrow for any vehicle can be selected, and the detailed information for that vehicle is displayed.

Figure 8:
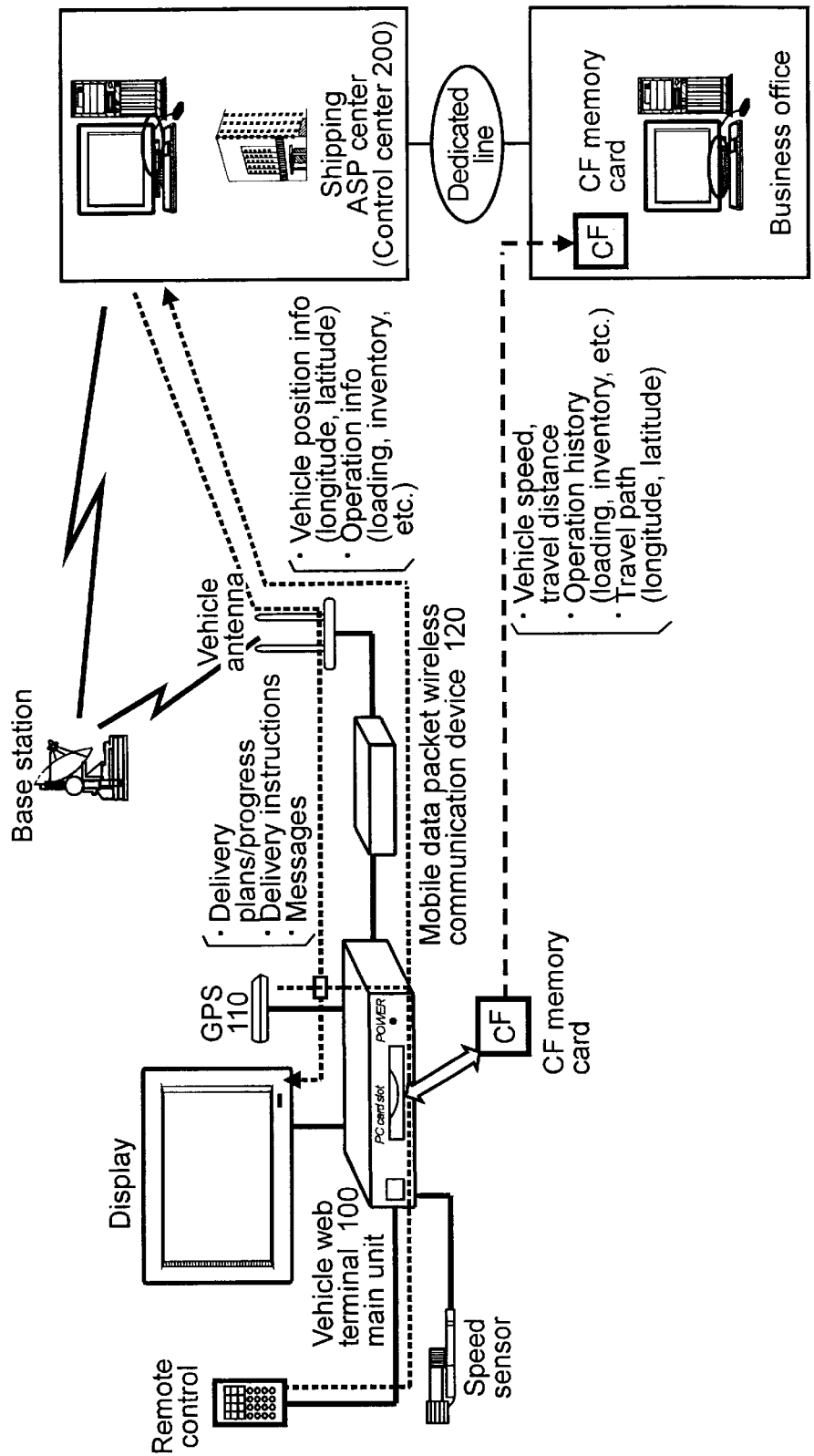
FIG. 8 is a system schematic diagram illustrating the structure and usage example of a vehicle terminal according to an embodiment of the present invention as applied to the trucking industry.

In addition, the model diagram of FIG. 8 shows one example for the construction of the vehicle terminal 100 used in the application of the present invention for the trucking industry according to the embodiment of FIG. 5. A GPS, a display, an operation remote control, a wireless device and antenna for mobile data packet communication service for communication with the ASP center (the control center 200), and a vehicle speed sensor are connected to a WEB vehicle terminal body (vehicle terminal) at the center 200. The body of the WEB vehicle terminal 100 is equipped with a PC card slot in which a CF (compact flash) memory card can be inserted. Log information on the vehicle position and work status is also recorded onto this CF memory card, and these are collected at the operation office and aid in the vehicle use management.

The above described embodiment is only an example for implementing the present invention. Alterations in design are possible without departing from the spirit of the present invention. For example, the GPS, the display device, and/or the packet communication device (wireless device) can be built into the vehicle terminal 100. Furthermore, the number of information centers 200 is not limited to one, and for example, there can be one for each region, and each information center 200 can cooperatively manage each vehicle. Furthermore, for the distance ranges from the destination site (check point), the specified radii are not limited to those given in the example, and a region or division with any shape is possible. Furthermore, when determining whether or not the vehicle is within the defined radius, other than using a method of calculating the distance between the current position of the vehicle and the checkpoint, various other determination methods can be used, such as comparing the current position of the vehicle and the position of the check point (latitude and longitude) without calculating the distance.

In this manner, according to the present invention, there is a determination on whether or not the position of the mobile terminal 100 is within a prescribed multi-stage distance range from the checkpoint. Once the mobile terminal 100 enters within any of the above multi-stage distance ranges, the mobile terminal 100 wirelessly reports its position to the control center 200. Therefore, compared to the system of the prior art in which the mobile terminal position is reported to the management system at a constant time interval, there are no unnecessary communication costs, and the vehicle position can be reported to the control center 200 in a timely manner.

Furthermore, as a position reporting system for a mobile terminal of a separate invention, when the moving body is outside of a specified distance range from the destination site, the mobile terminal 100 wirelessly reports its position to the control center 200 at a specified time period. Once the mobile terminal 100 enters within the distance range, the moving body position is wirelessly reported to the control center 200. By doing so, when the moving body is far from the destination site where its arrival is awaited, there is no need to know its minute positions in real time at a great frequency. As a result, the position can be reported at a comparatively longer time period, and communication costs do not need to be spent unnecessarily.

According to the present invention, vehicle positions can be reported to the control center 200 in a timely manner.

What is claimed is:

1. A mobile system to be installed in a vehicle monitored by a vehicle position management system having a detection device configured to detect a position of the vehicle, the mobile system comprising:
 a storage module configured to store a plurality of checkpoints associated with a planned route of the vehicle;
 an evaluation module configured to evaluate whether or not a vehicle position obtained from the detection device of the vehicle position management system is within a predetermined distance range organized as a plurality of radius distances from the checkpoint; and
 an output module configured to generate and output a signal based on evaluation by the evaluation module to provide wireless reporting of the vehicle position to a control center of the vehicle position management system when the vehicle position enters the distance range of one of the radius distances.

2. The mobile system of claim 1 wherein the output module is configured to generate and output a signal, if the evaluation module indicates that the vehicle position is outside the predetermined distance range, to provide wireless reporting of the vehicle position to the control center of the vehicle position management system at predetermined time intervals.

3. The mobile system of claim 2 wherein the storage module is configured to receive from the control center operations settings data containing the planned route and the checkpoints and to store the operations settings data, when the output module generates and outputs the signal to provide wireless reporting of the vehicle position to the control center.

4. The mobile system of claim 1 wherein the storage module is configured to receive from the control center operations settings data containing the planned route and the checkpoints and to store the operations settings data, when the output module generates and outputs the signal to provide wireless reporting of the vehicle position to the control center.

5. A mobile system to be installed in a vehicle monitored by a vehicle position management system having a detection device configured to detect a position of the vehicle, the mobile system comprising:
 a storage module configured to store a plurality of checkpoints associated with a planned route of the vehicle;
 an evaluation module configured to evaluate whether or not a vehicle position obtained from the detection device of the vehicle position management system is within a predetermined distance range organized as a plurality of radius distances from the checkpoint; and
 an output module configured to generate and output a signal, if the evaluation module indicates that the vehicle position is outside the predetermined distance range, to provide wireless reporting of the vehicle position to the control center of the vehicle position management system at predetermined time intervals.

6. The mobile system of claim 5 wherein the output module is configured to generate and output a signal based on evaluation by the evaluation module to provide wireless reporting of the vehicle position to a control center of the vehicle position management system when the vehicle position enters the distance range of one of the radius distances.

7. The mobile system of claim 5 wherein the storage module is configured to receive from the control center operations settings data containing the planned route and the checkpoints and to store the operations settings data, when the output module generates and outputs the signal to provide wireless reporting of the vehicle position to the control center.

8. A vehicle position management system comprising:
 a detection device configured to detect a position of the vehicle;
 a mobile system which includes:
  a mobile system storage module configured to store a plurality of checkpoints associated with a planned route of the vehicle;
  an evaluation module configured to evaluate whether or not a vehicle position obtained from the detection device of the vehicle position management system is within a predetermined distance range organized as a plurality of radius distances from the checkpoint; and
  a mobile system output module configured to generate and output a signal based on evaluation by the evaluation module to provide wireless reporting of the vehicle position when the vehicle position enters the distance range of one of the radius distances; and
 a vehicle position control system which includes:
  a control system storage module configured to store operations settings data including the planned route of the vehicle and the plurality of checkpoints associated with the planned route;
  a monitoring module configured to detect when the output module generates and outputs the signal to provide wireless reporting of the vehicle position; and
  a control system output module configured to read and wirelessly send the planned route and the operations settings data to the mobile system when the output module generates and outputs the signal to provide wireless reporting of the vehicle position as detected by the monitoring module.

9. The vehicle position management system of claim 8 wherein the mobile system output module is configured to generate and output a signal, if the evaluation module indicates that the vehicle position is outside the predetermined distance range, to provide wireless reporting of the vehicle position to the control center of the vehicle position management system at predetermined time intervals.

10. The vehicle position management system of claim 8 wherein the mobile system storage module is configured to receive from the control system output module operations settings data containing the planned route and the checkpoints and to store the operations settings data, when the output module generates and outputs the signal to provide wireless reporting of the vehicle position.

11. A method for managing vehicles, comprising:
 detecting a position of a vehicle being managed;
 evaluating whether or not the detected vehicle position of the vehicle is within a predetermined distance range organized as a plurality of radius distances from one of a plurality of checkpoints associated with a planned route of the vehicle; and
 wirelessly reporting the vehicle position to a control center when the vehicle position enters the distance range of one of the radius distances.

12. The method of claim 11 further comprising wirelessly reporting the vehicle position to a control center at predetermined time intervals, if the evaluated vehicle position is outside the predetermined distance range.

13. The method of claim 12 further comprising wirelessly receiving from the control center operations settings data containing the planned route and the checkpoints and storing the operations settings data, when the output module generates and outputs the signal to provide wireless reporting of the vehicle position to the control center.

14. The method of claim 11 further comprising wirelessly receiving from the control center operations settings data containing the planned route and the checkpoints and storing the operations settings data, when the output module generates and outputs the signal to provide wireless reporting of the vehicle position to the control center.

15. A method for managing vehicles, comprising:

detecting a position of a vehicle being managed;

evaluating whether or not the detected vehicle position of the vehicle is within a predetermined distance range organized as a plurality of radius distances from one of a plurality of checkpoints associated with a planned route of the vehicle; and wirelessly reporting the vehicle position to a control center at predetermined time intervals, if the evaluated vehicle position is outside the predetermined distance range.

16. The method of claim 15 further comprising wirelessly reporting the vehicle position to a control center when the vehicle position enters the distance range of one of the radius distances.

17. The method of claim 15 further comprising wirelessly receiving from the control center operations settings data containing the planned route and the checkpoints and storing the operations settings data, when the output module generates and outputs the signal to provide wireless reporting of the vehicle position to the control center.

18. A computer program product stored on a computer readable medium for managing vehicles, the computer program product comprising:

code for detecting a position of a vehicle being managed;

code for evaluating whether or not the detected vehicle position of the vehicle is within a predetermined distance range organized as a plurality of radius distances from one of a plurality of checkpoints associated with a planned route of the vehicle; and code for wirelessly reporting the vehicle position to a control center when the vehicle position enters the distance range of one of the radius distances.

19. The computer program product of claim 18 further comprising code for wirelessly reporting the vehicle position to a control center at predetermined time intervals, if the evaluated vehicle position is outside the predetermined distance range.

20. The computer program product of claim 18 further comprising code for wirelessly receiving from the control center operations settings data containing the planned route and the checkpoints and storing the operations settings data, when the output module generates and outputs the signal to provide wireless reporting of the vehicle position to the control center.

21. A mobile system to be installed in a vehicle monitored by a vehicle position management system having a detection device configured to detect a position of the vehicle, the mobile system comprising:

a storage module configured to store a plurality of checkpoints associated with a planned route of the vehicle;

an evaluation module configured to evaluate whether or not a vehicle position obtained from the detection device of the vehicle position management system is within a predetermined distance range organized as a plurality of regions including the checkpoint; and an output module configured to generate and output a signal based on evaluation by the evaluation module to provide wireless reporting of the vehicle position to a control center of the vehicle position management system when the vehicle position enters the distance range of one of the regions.

* * * * *